Jan. 17, 1933.  E. P. BECKER  1,894,341
MATERIAL FOR AND METHOD OF PROTECTING CONDUITS
Filed May 19, 1930
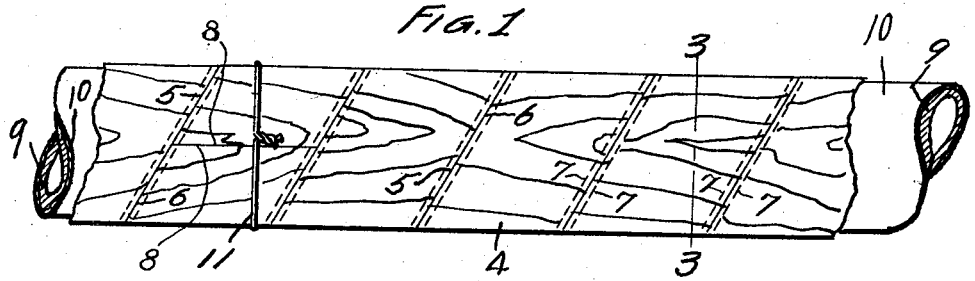
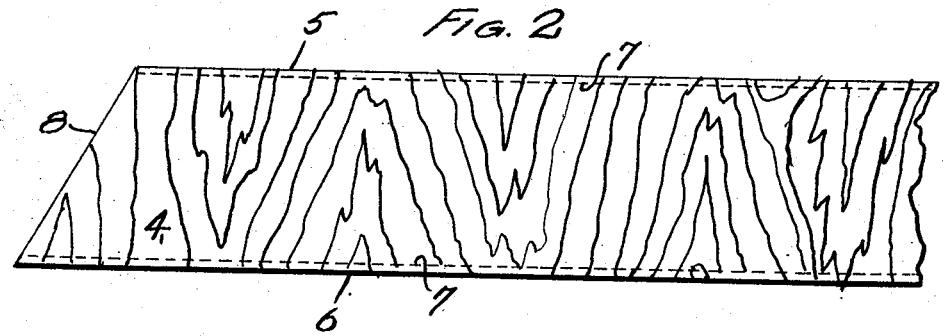
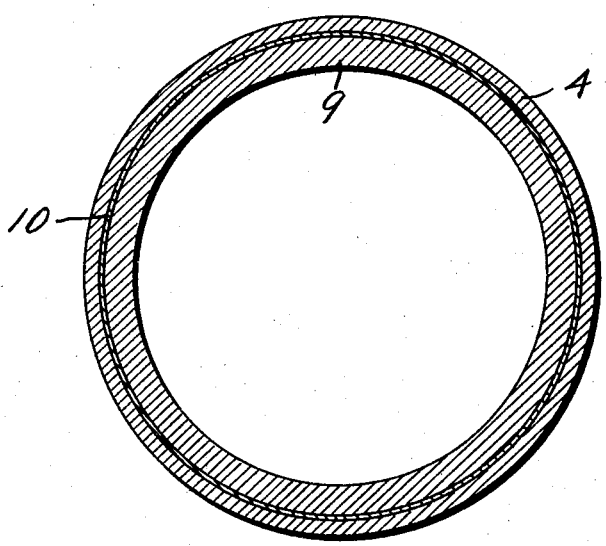
INVENTOR
EDWARD P. BECKER
By Edward E. Longan
ATTY.

Patented Jan. 17, 1933

1,894,341

UNITED STATES PATENT OFFICE

EDWARD P. BECKER, OF GRAND TOWER, ILLINOIS

MATERIAL FOR AND METHOD OF PROTECTING CONDUITS

Application filed May 19, 1930. Serial No. 453,709.

My invention relates to improvements in material for and method of protecting conduits and has for its primary object a material designed to be spirally wound about a conduit so as to protect the same while it is being laid in the ground.

A further object is to produce a material for protecting conduits which will resist the action of alkali when present in the soil.

A still further object is a material for protecting conduits which will prevent any scoring of the conduit while being laid in the ground by abrasive substances.

A still further object is the method of applying the protecting material in such a manner that it will snugly fit the conduit.

In the drawing, Fig. 1 is a side elevation of a fragment of conduit showing my material attached thereto and the method of applying it.

Fig. 2 is a fragmental plan view of a portion of my material and,

Fig. 3 is a section taken on the line 3—3 of Fig. 1.

In the construction of my material 4 represents a sheet of veneer having parallel edges 5 and 6. This veneer is made in the usual manner, that is by soaking the log and then cutting off a strip of material therefrom and while the material is still in a moistened condition, rows of stitching 7 are passed through the material parallel to the edges 5 and 6 and substantially at right angles to the grain of the material. The veneer 4 may be made of any desired width. The ends of each strip of veneer are cut off at an angle as indicated by the numeral 8. The purpose of using the stitching is to prevent the tearing apart of the strip of veneer in the event the same cracks while drying. This stitching also prevents the spreading apart of the veneer adjacent such cracking.

The method of applying my material is as follows:—

9 represents the conduit such as generally used for pipe lines, water pipe, etc. Such conduit is usually provided with a protective coating or enamel 10 which is alkali and acid proof so that it will not be effected by either alkali or acid conditions when the conduit is buried in the soil. Heretofore, this enamel was not protected in any way and it usually happened that where the conduit was laid in soil containing an abrasive such as sand, small stones and the like, the enamel was cut through in certain portions exposing the metal of the conduit to any acid or alkali action which might be present in the soil.

By my method, however, the enamel is protected so that it remains intact and unscored. Frequently the instruments used in laying such conduits also caused the protective coating or enamel to be broken. My protective coating also prevents this.

After the strip of material has been formed, it is wound spirally around the pipe or conduit as indicated in Fig. 1 with the edges in close contact with each other, in other words, the edges abut each other. This is done by starting the winding by placing the diagonal end of a strip longitudinally of the conduit in a line parallel to the axis of the conduit and continuing the winding of said strip. The diagonal end of the next strip is then placed in abutment with the adjacent end of the first strip and the winding of the second strip continued. Thus, the diagonal ends of adjacent strips continuously abut and serve as a guide or gage for the correct winding of the strips.

After a section of pipe has been thus covered, tie members 11 which may be either wire or other flexible material may be employed if desired. By reason of the spiral winding, a tight contact is maintained throughout the length of the pipe and in addition to this, as the material shrinks, it binds tightly about the pipe; in other words, its maximum shrinkage is lengthwise of the strip and therefore as it shrinks the binding tension around the pipe is increased so that if even loosely wound at the start, upon shrinkage the material will hug the conduit closer, but the stitching 7 will prevent the material from rupturing when strain is set up due to shrinkage.

My purpose in cutting the ends diagonally on the sheets of veneer is that, as hereinbefore set forth, the same creates a gage for the spiral winding or wrapping of the sheet around the conduit.

It is to be understood, of course, that the veneer or material can be wrapped around the conduits either by hand or by machinery and that the covering can be applied either at the plant or in the field.

It is my opinion that the machine wrapping will be preferable for the reason that a more uniform tension on the covering can be maintained during the wrapping than when done by hand. The specific means of applying the protecting material, however, is optional with the user, so therefore, I do not desire to limit myself to either the specific hand or machine method of applying this material.

Having fully described my invention, what I claim is:—

The combination with a conduit, of a covering comprising a strip of wood veneer of substantially uniform width throughout and whose grain extends laterally of the length of the strip, and the ends of the strip terminating in diagonal lines, whereby a pair of said strips may be wound spirally about and in contact with said conduit, with the diagonal ends of the adjoining strips in abutment and without overlapping and in a line parallel to the axis of the conduit, and fastening means at longitudinally spaced intervals for securing the covering to said conduit thereat, said conduit and covering being free of securement except at said fastening means.

In testimony whereof I have affixed my signature.

EDWARD P. BECKER.